United States Patent [19]

Wilson

[11] 4,113,813
[45] Sep. 12, 1978

[54] METHOD OF PREPARING AND BELLING THERMOPLASTIC PIPE WITH THICKENED WALLS

[75] Inventor: Clyde E. Wilson, Brazil, Ind.

[73] Assignee: Wilson-Tek Corporation, Brazil, Ind.

[21] Appl. No.: 790,303

[22] Filed: Apr. 25, 1977

[51] Int. Cl.² .............................................. B29D 23/00
[52] U.S. Cl. .................................... 264/25; 264/296;
   264/322; 425/393; 425/DIG. 218
[58] Field of Search ................... 264/25, 92, 296, 322;
   425/384, 392, 393, DIG. 218

[56] References Cited

U.S. PATENT DOCUMENTS

| | | | |
|---|---|---|---|
| 2,897,545 | 8/1959 | Meissner | 18/19 |
| 3,360,826 | 1/1968 | Lorang | 425/392 |
| 3,453,359 | 7/1969 | Clement | 264/296 X |
| 3,520,047 | 7/1970 | Muhlner | 29/423 |
| 3,557,278 | 1/1971 | Kuhlemann | 264/296 X |
| 3,635,639 | 1/1972 | Kresbach | 425/384 |
| 3,849,052 | 11/1974 | Gordon | 425/393 X |
| 3,865,912 | 2/1975 | Rosenkranz | 264/25 X |
| 3,899,565 | 8/1975 | Hertog et al. | 264/296 |

*Primary Examiner*—Thomas P. Pavelko

[57] ABSTRACT

A method and apparatus for expanding and shaping the end portion of a section of thermoplastic pipe to form a so-called "bell" thereon with a raised annular rib defining a sealing groove. The end portion to be belled is differentially heated to provide an intermediate zone of high temperature and plasticity for the rib, between two zones of lower plasticity for a lip and a barrel, the lip zone preferably being of higher plasticity than the barrel zone, and is forced onto a mandrel with radially expandable internal die sections and closable external die sections for shaping the rib. When the pipe is on the mandrel, the bell is thickened by axial compression, and then die-shaped so that the wall thickness increases progressively with the diameter of the rib. Two alternative differential heating methods are disclosed, one heating the different zones in steps, and one using heating chambers of different intensities in a one-step process.

12 Claims, 13 Drawing Figures

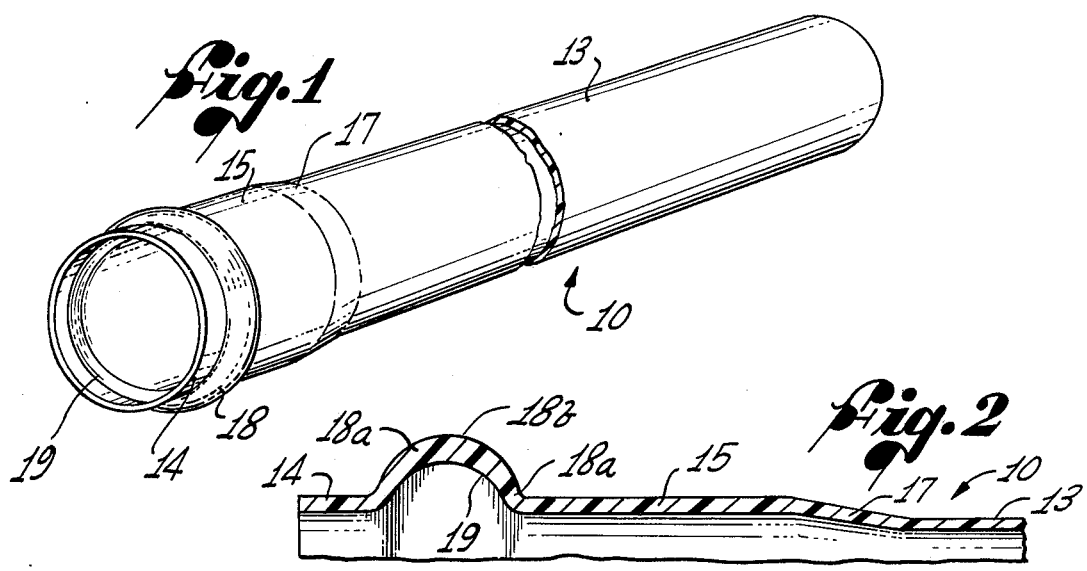
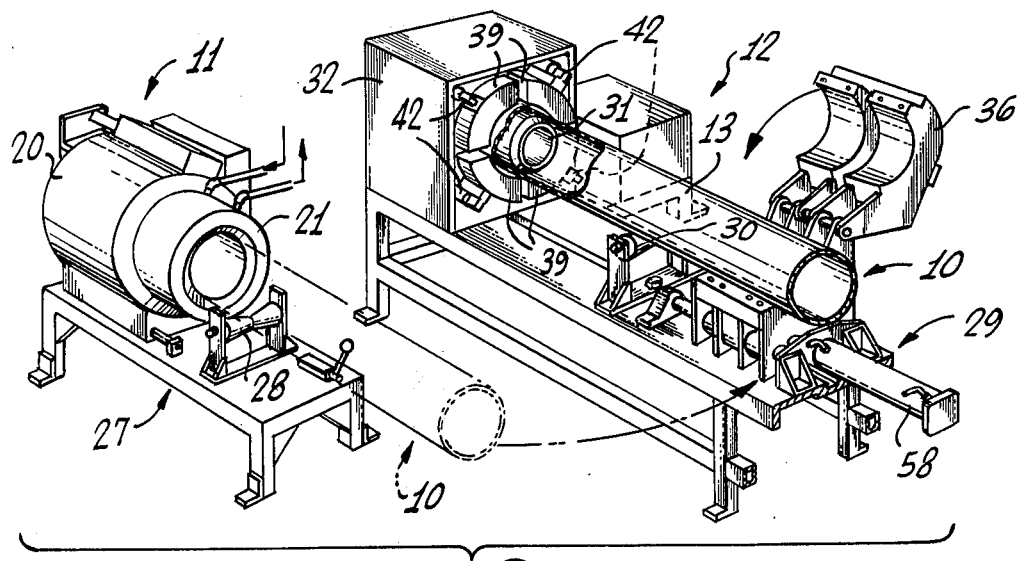
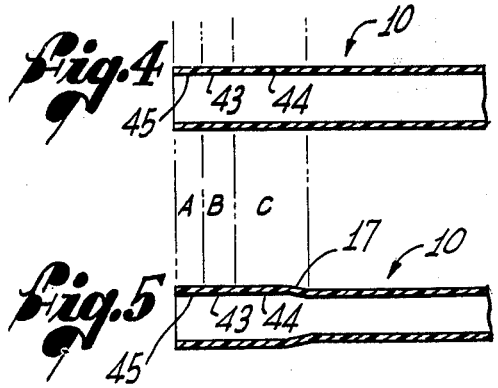
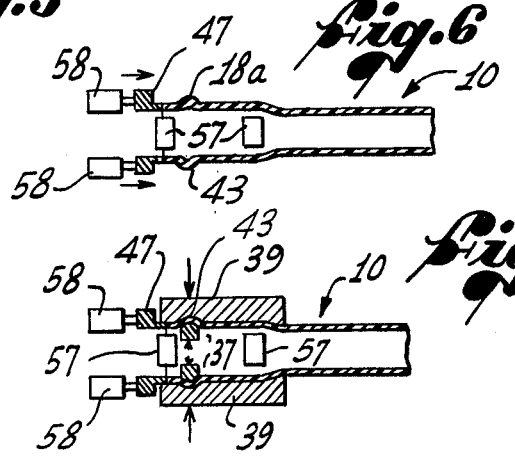

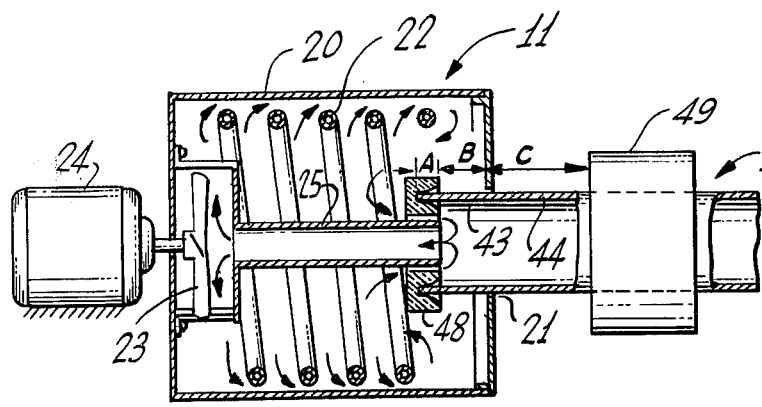
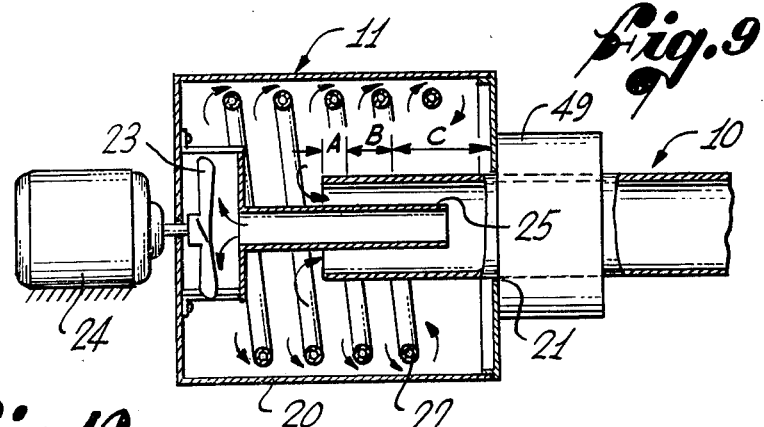
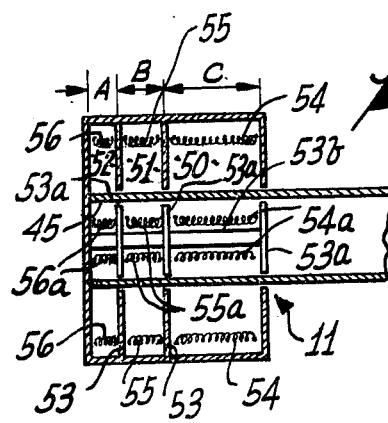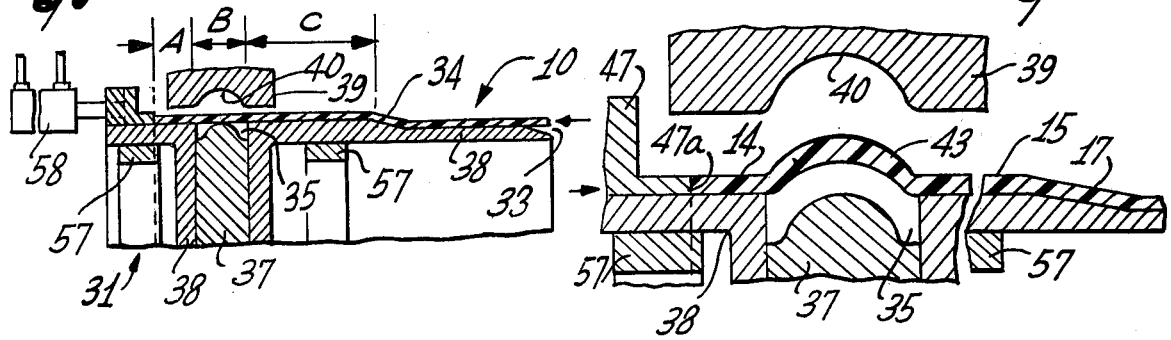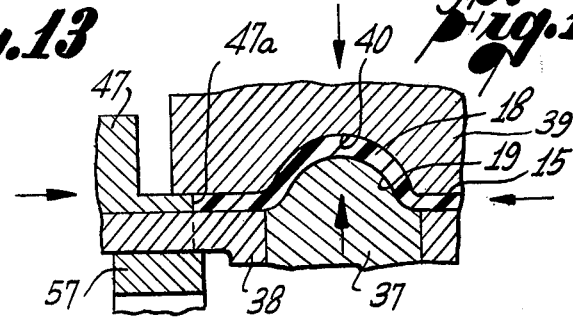

METHOD OF PREPARING AND BELLING THERMOPLASTIC PIPE WITH THICKENED WALLS

BACKGROUND OF THE INVENTION

This invention relates to the formation of expanded and specially contoured socket-end portions, frequently referred to as "bells", on lengths of pipe or tube composed of relatively rigid, thermoplastic material, and has particular reference to the thickening of the belled end portions of such pipes.

Plastic pipe, typically composed of polyvinylchloride (PVC), is becoming increasingly popular for a wide variety of uses, and the production of such pipe has developed into a substantial industry. At present, PVC pipe is extruded in straight, cylindrical form and in a variety of preselected diameters and wall thicknesses, and is cut to sections of selected length. One end of each section is belled, that is, expanded and formed to a special contour, to receive the unexpanded end portion of another section of pipe in telescoped and sealed relation, as part of a pipe line.

To seal the telescoped joints in a line of pipe, sealing gaskets are fitted between the telescoped portions of the pipe sections in internal annular grooves that are formed in raised external ribs on the belled end portions, to encircle and seal against the internal cylindrical end portions. Such grooves may be designed with various cross-sectional configurations, to receive gaskets of various designs, and typically are formed by deforming an annular portion of the plastic adjacent the end of the pipe section radially outwardly during the belling operation and then holding the plastic in the desired shape as it is cooled and sets.

There are several available machines for belling plastic pipe sections, one well-known type being shown in Kuhlemann U.S. Pat. No. 3,553,780, and another being shown in Niessner et al. U.S. Pat. No. 3,264,383. Another example of such a belling machine is shown in Wilson et al. application Ser. No. 512,230, filed Oct. 4, 1974.

Each of these belling machines utilizes a shaped mandrel which is inserted in the end portion of a plastic pipe section while the end portion is in a heated, thermoplastic state, to expand the end portion to the desired belled shape, either as an incident to the movement of the pipe section onto the mandrel or by expansion of a collapsed mandrel after it is within the pipe section. An external split mold ring frequently is provided to be clamped around the expanded pipe section, at least in the area of the seal rib, to clamp the pipe against the mandrel and determine the outside configuration of the bell.

Typically, the resulting bell has a short cylindrical lip or land adjacent its belled end, a raised annular rib, a corresponding internal gasket groove inside the rib, and a relatively long barrel portion beyond the groove with an inside diameter sized to receive the cylindrical end portion of the adjacent pipe section. This barrel portion is integrally joined to the cylindrical body of the pipe section by a short taper.

Standard specifications for such pipe sections prescribe wall thicknesses that should be provided for different pressure ratings of the pipe and for different pipe sizes, and sometimes specify that the wall thickness should increase with increases in the diameter of the pipe. Thus, as the diameter of the belled end portion of a pipe section increases, the wall thickness should increase correspondingly.

With conventional belling machines, however, the opposite condition is produced. Because the plastic is stretched radially outwardly as the pipe section is expanded, the largest-diameter portion of each section (the annular rib defining the gasket groove) has the thinnest wall, substantially thinner than the initial wall thickness, rather than the thickest wall, as prescribed by the standard specifications.

Concern regarding the reduced strength of the belled end portions of the pipe sections has resulted in efforts to reinforce the bells, either through thickening of the plastic walls or through the addition of extra layers of reinforcing material. The aforementioned Niessner patent discloses a method for extruding pipe with axially spaced, thickened sections which later will be expanded to form bells. Kuhlemann U.S. Pat. No. 3,557,278 discloses a method of thickening a bell by axial compression of the bell during the belling operation. An example of a laminated bell is shown in Parmann U.S. Pat. No. 3,887,992.

Thus, methods of reinforcing the bells of thermoplastic pipes are known, perhaps the most widely accepted being those disclosed in U.S. Pat. No. 3,264,383 and U.S. Pat. No. 3,557,278. Unfortunately, these methods either require relatively complex machinery or are relatively expensive, particularly in view of the consideration required by the patentees for use of the respective inventions. In addition, these known methods frequently are difficult to control, from the viewpoint of radial dimensional tolerances or axial location of raw material, because excessive thicknesses, or excessive axial length of thickened portions, are provided to insure that sufficient thickness will be provided in the critical areas.

Accordingly, a principal objective of the present invention is to provide a new and different method of thickening the belled-end portions of pipe sections, which method is beyond the scope of the aforesaid patents and which, at the same time, is relatively simple and inexpensive to use, and provides close control of the location of the thickened portions.

SUMMARY OF THE INVENTION

The present invention resides in a method of preparing a pipe section for belling and of controlling the plastic displacement during belling, to avoid stretching and thinning of the plastic in the rib that defines the gasket groove, and instead, making it possible to provide an excess of material in this rib, so that the rib may be thickened, as required, for increased strength, and also to increase the wall thickness in the lip and barrel portions. In general, the method involves the preheating of different zones of the portion to be belled to different degrees, for differing degrees of softness of plasticity, and specifically to provide an intermediate rib-forming zone of the bell that is of relatively high temperature and plasticity, and a barrel-forming zone of lower temperature and plasticity, and the application of axial pressure to the pipe during the belling process, to axially compress and thicken the bell, principally in the rib-forming zone. The lip- and barrel-forming zones also are thickened, at least to the lesser degree required by the smaller diameters, also by axial compression during the belling operation.

As a result of the differential heating, the barrel-forming portion of the pipe remains sufficiently stiff to sustain the forces developed during the relative movement of the mandrel and the pipe, without objectionable wrinkling, and yet soft enough to thicken under compression. Similarly, the lip portion of the bell through which the principal axial compressing force is applied to the rib-forming zone, also remains sufficiently stiff to transmit the compressing pressure to the rib-forming zone after expansion.

More specifically, the method of the invention, in its presently preferred mode, comprises the steps of differentially heating the bell portion of a pipe section to produce a softened annular end zone of relatively low temperature and high plasticity for the rib, and slightly longer than the finished rib, and a softened annular zone of relatively low temperature and plasticity for the barrel; expanding the bell portion by relative axial movement of the pipe onto a mandrel having an outside contour corresponding to the desired inside contour of the bell; axially compressing the bell portion by shifting the lip portion and the barrel portion toward one another, thereby axially compressing the lip and substantially increasing the material available in the intermediate zone of highest plasticity; die-shaping the rib, preferably both internally and externally, between contoured die sections defining an annular space having the contour and radial thickness desired for the sealing rib and axially compressing the barrel portion, if needed, to increase its wall thickness. To facilitate expansion of the lip by the mandrel, the lip-forming zone may be heated initially to a somewhat higher temperature and plasticity than the rib-forming zone, although lower than that of the barrel-forming zone, and subsequently cooled to some extent by contact with controlled-temperature areas of the mandrel.

In the presently preferred mode, the differentially heated bell portion is forced onto the mandrel and is compressed while the internal die sections are retracted, these sections being expanded just before the external die sections are closed. This facilitates the insertion of the mandrel into the pipe by avoiding the necessity of forcing the semi-softened lip portion over expanded internal die sections. Under some circumstances, however, it may be possible to insert the mandrel with the internal die sections expanded. In either case, the pipe should be held during the compression step to prevent reverse movement.

Axial compression of the barrel portion is accomplished by moving the pipe toward the mandrel, typically after the external die sections have been closed, by shifting the usual pipe-holding clamps toward the mandrel by a selected amount. The barrel portion should be maintained in a plastic state until this is done, preferably by controlling the temperature of the portion of the mandrel in contact with the barrel portion, to prevent excessive cooling. In some instances, however, sufficient thickening of the barrel portion may be obtained as an incident to the forcing of the pipe onto the mandrel, thus eliminating the need for additional compression.

Differential heating may be accomplished in various ways, one illustrative method using a conventional heater and another using a special, differential heater. Using the conventional heater, the end of lip zone is covered and the lip and intermediate zones are inserted in the heater for a preselected time period, thereby limiting the heating substantially to the intermediate zone. To increase the softness of the lip zone, the cover is removed for a short time interval, and then all three zones are inserted in the heater for a final interval, further heating the intermediate zone to a relatively high temperature while the lip and barrel zones are brought up to the desired lower temperatures. The cover can be designed with clearances to allow sufficient circulation around the lip zone so that the cover can remain in place during both intervals.

An illustrative differential heater has three axially spaced radiant heating zones that are separated by radial partitions formed with coaxial center holes sized to receive the pipe with a close fit. Radiant heating coils in the central heating zone generate heat of higher intensity that the coils in the two end zones, thereby heating the intermediate zone of the pipe to a selected higher temperature during one heating cycle of preselected length.

Specific temperatures to be imparted to the three zones of the pipe may vary with the circumstances, including the specific type and size of pipe being belled. In general, the end zones should be heated sufficiently to become plastically deformable without losing their ability to be self-supporting, substantially the same as is presently the practice for the heating the entire end portion of a pipe to be belled. The intermediate zone should be heated to a considerably higher degree, and to a substantially softer state, for ready deformation after the pipe is on a mandrel. Because the intermediate zone is required to force the free end portion onto the mandrel, however, it must retain some axial strength. This need can be reduced by initially heating the lip zone to a higher temperature than is needed, controlling the temperature of the mandrel to cool the lip zone after it is in place on the mandrel and prior to thickening of the intermediate zone. The actual heating time and mandrel temperature controls required to achieve these conditions can best be determined empirically, while working with the particular pipe that is to be belled.

Other aspects and advantages of the invention will become apparent from the following detailed description, taken in conjunction with the accompanying drawings.

BRIEF DESCRIPTION OF THE DRAWINGS

FIG. 1 is a perspective view, partially broken away, showing a section of belled pipe of a type that is produced with the present invention;

FIG. 2 is an elongated fragmentary cross-sectional view taken longitudinally through the belled-end portion of the pipe in FIG. 1, and illustrating in somewhat exaggerated fashion, the increased wall thickness in this portion;

FIG. 3 is a fragmentary perspective view of an apparatus for practicing the invention;

FIGS. 4 through 7 are diagrammatic cross-sectional views illustrating the steps of the invention, FIG. 7 including a modification of the apparatus of FIG. 3;

FIG. 8 is an enlarged diagrammatic cross-sectional view illustrating a first step in the differential heating of a pipe section in accordance with the present invention in a conventional heater;

FIG. 9 is a view similar to FIG. 8 illustrating a second step in the differential heating of the pipe section;

FIG. 10 is a fragmentary cross-sectional view taken longitudinally through a belling mandrel with a partially belled pipe thereon, and including the modification of FIG. 7;

FIG. 11 is an enlarged fragmentary cross-sectional view similar to part of FIG. 10, after axial compression of the rib-forming portion;

FIG. 12 is a view similar to FIG. 11 after expansion of the internal die sections and closing of the external die sections; and FIG. 13 is a diagrammatic cross-sectional representation of an alternative heater having differential radiant heating zones.

DETAILED DESCRIPTION

Shown in the drawings for purposes of illustration are a representative section 10 of belled PVC pipe (FIGS. 1 and 2), and apparatus (FIG. 3) for belling such pipe, including a heater 11 and a belling machine 12. The heater 11 is used to soften the end portion of the pipe to be belled, and the belling machine 12 is used to expand and shape the heated end portion of the pipe to the desired size and contour, and to hold the pipe as it sets. These units, and the pipe itself, may be basically conventional in construction, and thus will be described herein only to the extent necessary for an understanding of the invention.

With respect to the belled pipe section 10, it will be seen in FIGS. 1 and 2 that the pipe has an elongated cylindrical body 13, typically extruded in a selected size and wall thickness, and is formed at one end with a bell for telescoping over the unbelled end portion of a similar section of pipe. The free end portion of the bell is a narrow cylindrical lip or land 14 having an inside diameter for receiving a pipe body with a prescribed fit, and the opposite end portion 15 of the bell is a somewhat longer barrel, of the same, or otherwise prescribed, inside diameter, into which the pipe body extends in the completed pipe joint (not shown). The barrel is joined to the pipe body by a short taper 17, shown most clearly in FIG. 2.

Between the lip 14 and the barrel 15 is an external annular rib 18 which defines an internal groove 19 for receiving a seal ring (not shown). Such rings are used to seal completed joints against leakage of fluid from the joints, and may have various cross-sectional shapes, such as round, square, double radius, and stepped. The details of these shapes are not particularly important to the present invention.

With respect to the belling apparatus, the heater 11 is shown as a conventional forced-air heater into which the end portion of a pipe section 10 to be belled may be inserted, in the manner shown in FIG. 9. Such a heater has an external, generally cylindrical shell 20 with an opening 21 in one end, a spiral heating coil 22 inside the shell, and a blower 23, driven by a motor 24, for circulating air within the shell. To control the circulation in one such heater, the blower circulates hot air around the pipe by drawing the air through a tube 25 extending into the pipe section 10, and forcing the air outwardly to flow across the heating coil, then along the outer side of the pipe section, and back into the pipe section for recirculation through the tube 25. To confine the hot air in the heater, the interior of the pipe should be blocked, either at the outer end or adjacent the front wall of the heater. The heater is mounted on a table 27 (FIG. 3) with a suitable support 28 for holding the pipe sections as they are heated.

The illustrative belling machine 12, shown in FIG. 3 and in part in FIGS. 10-12, also is mounted on an elongated table 29, partially shown in FIG. 3, and has supports 30 for guiding the pipes as they are being belled.

The basic operative component of the belling machine is a belling mandrel 31 which is shown mounted on one side of a box-like housing 32 on the table 29 and is of basically conventional construction, having a beveled front end or nose 33 (see FIG. 10) for insertion in a pipe, an inclined step 34 for expanding the pipe to the size of the lip 14 and the barrel 15, and a peripheral gap 35 in which a set of selectively operable, radially expandable and collapsible die sections 37 are mounted. Beyond the gap 35 is a cylindrical section 38 upon which the lip 14 is positioned when the pipe section 10 is in place on the mandrel 31. The table 29 also supports a movable feed clamp 36 of a conventional type for holding the pipes in alignment with the mandrel and pushing the pipes onto the mandrel.

Mandrels of the foregoing general type are sold by Wilson-Tek Corporation, Brazil, Ind., and are shown in detail in the aforesaid application, and generally similar mandrels are available from others. With such belling apparatus, the practice has been to heat the end portion of a pipe section that is to be expanded until it is softened to a preselected extent, substantially uniformly along at least the bell-forming portion of the pipe section. Then the heated portion is forced over the mandrel either while the internal die sections 37 are expanded or with the die sections initially collapsed, in which case the die sections have been expanded after the pipe section is on the mandrel. It will be apparent that the insertion of the mandrel may be accomplished either by moving the pipe onto the mandrel or by inserting the mandrel into the pipe, movement of the pipe being preferred.

To insure that the bell conforms to the shape of the mandrel, belling mandrels sometimes have been provided with a set of external die sections 39, of the general types shown in full in FIG. 3 and partially in FIGS. 10-12. These die sections, of which four are shown in FIG. 3, have inside surfaces 40 (FIGS. 11 and 12) that are complementary, when closed, to the outside shape of the finished bell in the area of the external rib 18, including an internal annular groove (FIGS. 10-12). The die sections are connected to suitable actuators 42 (FIG. 3) and supported for movement generally radially in and out between closed and open positions, as illustrated in FIGS. 11 and 12.

After the bell has set in the desired configuration, typically with the assistance of a cooling medium, the internal die sections 37 are collapsed inwardly out of the seal groove 19 and the external die sections 39 are opened, away from the finished bell. Then the belled pipe 10 can be pulled relatively freely from the mandrel 31. The clamp 36 is used for removal, and a stripper ring sometimes has been provided to push on the belled end.

As has been suggested, one disadvantage of the conventional approach described above has been the inherent thinning of the walls of the bell as an incident to its radial expansion, particularly in the area of the rib 18 where the expansion is the greatest. Although efforts have been made to compensate for this, as shown in the aforesaid patents, the presently available solutions to the problem are either relatively complex and expensive, or are otherwise unsatisfactory for some reason, in some instances because the patent owners require very substantial royalties for use of the patented methods.

The present invention provides an alternative solution which is a substantial improvement and simplification as compared to many of the prior approaches, avoiding the need for laminated bells, pre-thickening, and the like. At the same time, the invention permits the use of conventional belling machines, with relatively minor modifications to adapt the machines for the practice of the invention.

In accordance with the invention, a pipe section 10 is prepared for belling by differentially heating the end portion to be belled, so that an intermediate zone 43 (FIGS. 4 and 5) of the pipe section is softened to a substantially greater extent than the zones 44 and 45 that will constitute the barrel 15 and the lip 14. After the differential heating step, the pipe section is forced onto the mandrel 31 (diagrammatically illustrated in FIG. 5) and is compressed axially, from the free end thereof (diagrammatically illustrated in FIG. 6), to thicken the lip zone to some extent and the relatively soft material in the intermediate zone to a greater extent, as indicated at 43 in FIGS. 6 and 11, and this intermediate zone is confined and shaped between the die sections 37 and 39 (FIG. 7) to the desired final configuration. The thickness and cross-sectional shape of the radial gap defined between the die sections determine the wall thickness and the cross-sectional shape of the wall, and the gap thus can be designed to produce precisely the wall configuration that is desired.

Preferably, the initial expansion of the bell is accomplished with the internal die sections 37 collapsed, and the initial axial compression is accomplished with a thickening ring 47 that is engaged by the free end of the pipe section 10 as it arrives at a preselected position on the mandrel 31. The thickening ring subsequently is moved toward the pipe to accomplish the desired compression, while the clamp 36 holds the pipe in place, or pushes the pipe slightly toward the ring.

Although some degree of thickening of the barrel portion of a pipe is achieved as an incident to the pushing of the pipe onto the mandrel, in many instances additional thickening is necessary or desirable. For this purpose, another aspect of the invention provides for thickening of the barrel portion by axial feeding of the pipe onto the mandrel, after the die sections 39 have been closed, but before the barrel portion of the pipe has cooled and set. Such feeding is accomplished by moving the clamp 36 a preselected increment, and excessive cooling is prevented by controlling the temperature of the mandrel portion that is in contact with the barrel portion. Also, the external die sections 39 are extended to cover the barrel portion, to confine and shape this portion as well.

The aforesaid steps, and the components of the belling apparatus used in such steps, are illustrated more specifically in FIGS. 8-13. Using the conventional forced air heater 11 shown in FIGS. 8 and 9, the end portion of a pipe section 10 to be belled is differentially heated during two intervals, preferably using an annular insulating cover 48 to shield the end lip zone 45, as illustrated in FIG. 8. The cover has a large enough inside diameter to permit a flow of hot air around the outside of the pipe, but it prevents radiant heat from reaching the pipe directly. Although the lip zone 45 should not be softened as much as the intermediate zone 43, it should be softer than the barrel 44, since it must be pushed onto the mandrel by the intermediate zone.

The illustrative cover 48 has an axial length somewhat greater than the length of the lip zone 45, and has an annular, axially opening groove in one side with a depth equal to the axial length of the lip zone. For heat leakage, the groove increases in radial width toward its open side, to expose the lip zone 45 to a limited degree of heating. As an alternative to the loose fitting cover, it is possible to use a cover that prevents heated air from flowing over the pipe, removing this cover after part of the heating process has been completed (as shown in FIG. 9) to soften the lip to the desired extent.

It will be seen in FIG. 8 that the barrelforming zone 44 of the pipe remains outside the heater during the first interval, and thus remains substantially at ambient temperature. During the second interval, illustrated in FIG. 9, all three zones 43, 44 and 45 are disposed in the heater, with the cover 48 removed from the end of the pipe section if a heat-leaking cover is not used. Thus the entire portion to be belled is heated during this interval, and the final temperature of each zone is determined by the total effective heating time for that zone.

During the heating process, a short section of the pipe adjacent the tapered section 17 may be wrapped in a cooling jacket 49 to maintain a cold zone when the pipe is not softened and retains its dimensional stability. A plug (not shown) can be positioned in the pipe, preferably at the end of the tapered section, to prevent circulation of heated air into the pipe and also to prevent loss of heated air through the pipe. With such a plug, the need for the jacket 49 is reduced, and the jacket may be eliminated, if desired.

The specific heating temperatures and times will vary with the size, wall thickness and type of material being treated, and even as between pipes produced with different extruding processes. Accordingly, the optimum treatment for any given type of pipe should be determined empirically, using the principles stated herein as guidelines. It is important that the material of the pipe sections to be belled be reasonably uniform to achieve repeatable results, because empirically determined optimum conditions for one type of material will not necessarily be optimum for another material.

As a general example, for P.I.P. pipe composed of PVC and having an 8-inch diameter, an 80 psi rating, and a prescribed S.D.R. of 51, a satisfactory heating cycle in a heater of the type shown in FIGS. 8 and 9, maintained at approximately 420° F., comprised a first interval totaling 2 minutes and 30 seconds (with the insulating ring 48 removed the last 25 seconds) and a second interval of 1 minute. Thus, the total direct heating time for the intermediate zone 43 was the sum of the two intervals, or 3 minutes and 30 seconds, while the total direct heating time for the lip zone 45 was one minute and 25 seconds. The direct heating time for the barrel zone 44 was only one minute, which is sufficient to soften the plastic for the limited expansion in this zone. With a heat-leaking cover, the total heating time remains the same, but the cover need not be removed.

As a result of the heating operation, the intermediate zone 43 becomes quite soft, and capable of being thickened as a result of axial compression, and the lip zone 45 is soft enough to be forced relatively freely onto the mandrel while being sufficiently firm, when in place on the mandrel, to transmit compressive force from the end of the pipe back to the intermediate zone. The weight of the lip zone that is structurally supported by the intermediate zone during handling of the pipe is relatively small, but it may be desirable to rotate the pipe 180° during handling in view of the tendency of the softened plastic to sag.

The alternative heating 11' shown in FIG. 13 is designed to produce a similar differentially heated end portion of a pipe in a single heating interval, using three chambers 50, 51 and 52 in which heat of different intensity is generated. This heater has two axially spaced annular inside partitions 53 that are positioned to encircle the opposite boundaries of the intermediate zone 43 of a pipe that is inserted in the heater, as shown in FIG. 13, and the space inside the pipe is partitioned by three coaxial discs 53a on a rod 53b that is supported contilever-fashion on the end wall of the shell. Radiant heating coils 54, 55 and 56 are provided in the three outside chambers, and have different preselected ratings that will produce the desired differential heating during one preselected time interval. Similar coils 54a, 55a and 56a are provided in the three inside chambers, so that the pipe is differentially heated from both sides. Such a heater has not been built, but it is believed that the design criteria will be readily within the skill of the art.

When the pipe has been differentially heated, it is promptly transferred to the belling machine 12 (FIG. 1) and belled. This may be accomplished manually or automatically, depending upon the available equipment. In either event, the pipe is positioned by the clamp 36 in axial alignment with the mandrel 31 and moved axially by the clamps onto the mandrel.

As shown in FIG. 10, the initial step in belling, preferably performed with the external dies 39 open and the internal dies 37 collapsed, simply expands the heated end portion of the pipe 10 to the diameter of the lip 14 and the barrel 15, (see FIGS. 5 and 10), in substantially the same manner that has been used in other belling methods. It has been found that a somewhat slower feed speed is desirable, because of the condition of the pipe. It also has been found to be desirable to heat the mandrel to a moderate temperature, such as 120° F. in the area that engages the lip zone, and 140° in the area that engages the barrel zone, to control cooling and avoid premature setting of the pipe as it slides along the mandrel, and particularly to control the temperature of the barrel zone of the pipe prior to axial compression by the clamp 36.

For this purpose, selectively operable internal mandrel heaters 57 are provided in the mandrel, as shown in FIG. 10. It is not necessary, to heat the mandrel to a degree that would increase the temperature of the pipe, since the desired belling temperature levels, or higher, can be imparted initially, and only temperature maintenance is needed.

The first step on the belling machine 12 shapes the bell except for the rib 18, and positions the intermediate zone 43 between the internal and external die sections 37 and 39, terminating when the end of the pipe engages a stop 47ᵃ that is positioned on the mandrel 31 a preselected distance from the incline 34. This distance is greater than the length of the bell to be formed, by an amount sufficient to provide a calculated amount of additional material to be fed into the bell by axial compression of the pipe.

In this instance, the stop 47ᵃ is the annular front side of the compression ring 47, previously mentioned, and the ring is slidably telescoped around the cylindrical rear portion 38 of the mandrel and positioned thereon by a suitable actuator 58 such as a double-acting pneumatic or hydraulic cylinder. Also associated with the compression ring is a sensing switch (not shown) which is responsive to engagement of the pipe with the compression ring and operable to control feeding movement of the clamp 36 and to activate the actuator 58 for the compression of the pipe.

When the actuator 58 is activated, the compression ring 47 is moved a preselected distance toward the pipe, to the right as viewed in FIGS. 6 and 12, while the clamp 36 holds the pipe stationary, or moves in a slow, controlled fashion a short additional distance toward the ring. The optimum relative movement can be calculated for each situation, using the wall thickness of the pipe and the increased amount of material to be provided in the rib 18. As a result of this movement, the lip is compressed axially and the intermediate zone is compressed and radially thickened to a greater extent, preparatory to the shaping of the rib 18, as illustrated in an exaggerated manner in FIGS. 6 and 11. It should be noted, however, that the precise configuration assumed by the compressed intermediate zone 43 may vary, and that the drawings merely illustrate the compression in a representative manner.

When the internal die sections 37 are expanded and the external die rings 39 are closed (See FIGS. 7 and 12), the thickened intermediate zone 43 is shaped to precisely the configuration that is desired for the rib 18 and the groove 19. As shown in the example in FIG. 2, the resulting wall configuration can have a thickness that increases progressively from each end portion $18^a$ of the rib toward the center portion $18^b$, where the diameter is the greatest. All that is necessary is the proper shaping of the die surfaces defining the space in which the rib is formed, coupled, of course, with the provision of the correct amount of material in sufficiently soft condition to be shaped.

To thicken the barrel wall to a substantial extent, the pipe is fed an additional preselected amount by movement of the clamp 36, after the die sections 37 have been expanded and the die rings 39 have been closed, to compress the barrel portion to a selected extent. To maintain the material of the barrel section in a plastic state until this has been done, the forward heating element 57 controls the temperature in the front mandrel section, and maintains the temperature of the mandrel at a level that prevents objectionable cooling. Again, the amount of axial feed that is needed can be calculated according to the amount of thickening desired, and the external die rings (see FIGS. 7 and 10) confine and shape the plastic.

After the plastic has set, the external die sections 39 are opened, and the internal sections 37 are collapsed, so that the belled pipe can be removed from the mandrel in the usual way. The compression ring 47 and the clamp 36 are returned to their original positions, ready for the next pipe section 10 to be belled. This section can be in process in the heating operation while the preceding section is being belled.

From the foregoing, it should be evident that the present invention provides a process by which thermoplastic pipe sections can be provided with expanded bells having controlled minimum wall thicknesses and configurations, including thicknesses that increase progressively with the diameter. Moreover, this important advantage can be achieved with basically conventional belling machines, after only minor modifications, and also with conventional heaters, with some increase in manipulative steps and the total time involved in the heating cycle. For faster differential heating, a special heater with differential heating zones can be provided.

It also will be apparent that, while particular embodiments of such equipment and the presently preferred mode of practicing the invention have been specifically described, various modifications and changes may be made by those skilled in the art. For example, the external die sections 39 might be closed during the initial expansion step, if measures ae taken to avoid premature cooling of the plastic, and it is possible that the internal die sections might be expanded during this initial expansion, although this would increase the resistance to movement of the lip zone 45 onto the mandrel, to a degree that is presently believed to be objectionable. In addition, the axial compression of the bell can be accomplished simply by stopping the leading end of the pipe prematurely, just prior to termination of axial feeding of the pipe, and utilizing the terminal portion of such feeding movement as a substitute for movement of the compression ring 47.

These and other modifications may be made without departing from the spirit and scope of the invention.

I claim:

1. A method of preparing a section of thermoplastic pipe for belling, and of forming a bell on one end portion of the pipe section having a lip at the end of the pipe section, a raised annular rib defining an internal annular seal groove, and a barrel extending from said rib to the body of the pipe section; using a heater and a belling machine having a mandrel formed with an outside shape corresponding to the desired inside shape of the lip and the barrel, radially expandable and contractible internal die sections having an outside shape, when expanded, corresponding to the desired inside shape of said groove, and openable and closable external die sections around said internal die sections having an inside shape, when closed, corresponding to the desired outside shape of said rib and barrel, said method comprising the steps of:

differentially heating said one end portion of the pipe section to provide a first zone of relatively low temperature and plasticity for said barrel, a second zone of relatively low, but higher, temperature and plasticity at the end of said pipe section for said lip, and a third zone of relatively high temperature and plasticity for said rib;

inserting said mandrel in the differentially heated end portion of said pipe section with said internal die sections contracted and said external die sections open, and positioning said first and third zones of said one end portion between said internal and external die sections;

moving said second zone axially toward said first zone through a preselected distance to axially compress said one end portion;

closing and expanding said external and internal die sections, respectively, to confine said third zone between said sections and shape said rib and said groove to the desired external and internal contours;

pressing said first zone toward said third zone to compress said third zone and thicken said barrel; and after the material in said one end portion has set, opening and contracting said external and internal die sections, respectively, for removal of the pipe section from the belling machine.

2. The method as defined in claim 1 in which the differential heating step is performed by first inserting only said second and third zones of said one end portion in said heater for a first preselected time interval with said second zone at least partially insulated from heating, then inserting only said second and third zones in said heater for a second preselected time interval without insulation, and then inserting all three zones in said heater for a third preselected time interval without insulation.

3. The method as defined in claim 1 in which the differential heating step is performed by first inserting only said second and third zones of said one end portion in said heater for a first selected time interval with said second zone partially insulated from heating, and heating said second zone to a lesser extent than said third zone, and then inserting all three zones in said heater for a second preselected time interval with said second zone partially insulated, thereby heating said second zone to a lesser extent than said third zone during both of said time intervals.

4. The method as defined in claim 1 in which the differential heating step is performed by subjecting said one end portion to radiant heat of different selected intensities in said zones, for one selected time interval.

5. The method as defined in claim 1 in which said mandrel has a compression ring positioned to be engaged by said end of said pipe section when said one end portion is fully on said mandrel, and an actuator for moving said compression ring forwardly toward the pipe section said preselected distance to compress said one end portion, in which the compressing step is performed by activating said actuator to move said ring forwardly said preselected distance after said pipe section engages said compression ring.

6. The method as defined in claim 1 including the further step of heating the portion of said mandrel that contacts said first zone when the pipe is in place on the mandrel, to maintain the temperature of the first zone while the external and internal die sections are being closed and expanded, preparatory to the pressing step.

7. A method of preparing a section of thermoplastic pipe for belling and of forming a bell on one portion of the pipe section having a lip at the end of the pipe section, a raised annular rib defining an internal annular seal groove, and a barrel extending from said rib to the body of the pipe section; using a heater and a belling machine having a mandrel formed with an outside shape corresponding to the desired inside shape of the lip and the barrel, radially expandable and contractible internal die sections having an outside shape, when expanded, corresponding to the desired inside shape of said groove, and openable and closable external die sections around said internal die sections having an inside shape, when closed, corresponding to the desired outside shape of said rib; said method comprising the steps of:

differentially heating said one end portion of the pipe section to provide a first zone of relatively low temperature and plasticity for said barrel, and second and third zones of higher temperatures and plasticities for said lip and said rib, respectively;

inserting said mandrel in one end portion of said pipe section with said internal die sections contracted and said external die sections open, and positioning said third zone of said one end portion between said internal and external die sections;

axially compressing said one end portion by a preselected amount to thicken the material at least in said third zone;

and clamping said third zone between said external and internal die sections to impart the desired internal and external shape to said ring.

8. The method as defined in claim 7 in which said second zone is heated during said differential heating step to a lower temperature and plasticity than said third zone.

9. The method as defined in claim 7 in which the axial compression step is performed by moving said second zone axially along the mandrel toward said first zone.

10. A method of preparing a section of thermoplastic pipe for belling and of forming an enlarged bell on one end portion of the pipe section and a raised annular external rib on said bell defining an internal seal groove in the bell, said method comprising the steps of:

differentially heating said one end portion to provide an intermediate zone of higher temperature and plasticity than the remainder of said one end portion in the area of said one end portion that will form said rib;

expanding said one end portion radially to form the enlarged bell on said pipe section;

axially compressing said one end portion to thicken at least the intermediate zone;

and die-shaping the thickened intermediate zone to the desired final configuration.

11. The method as defined in claim 10 in which the axially compressing step is performed in two stages, first by moving the belled end of the pipe toward the intermediate zone, and then by moving the pipe section toward the intermediate zone.

12. The method defined in claim 11 in which said intermediate zone is die-shaped after thickening and prior to the second stage of the compressing step.

* * * * *